United States Patent [19]
Sato et al.

[11] Patent Number: 5,709,951
[45] Date of Patent: Jan. 20, 1998

[54] COMPOSITE DEPOSITED FILM AND PRODUCTION PROCESS THEREOF

[75] Inventors: Tomoaki Sato; Hiroyuki Oba; Hideaki Tanaka; Tomohisa Hasegawa, all of Ibaraki-ken, Japan

[73] Assignee: Kureha Kagaku Kogyo K.K., Tokyo, Japan

[21] Appl. No.: 502,033

[22] Filed: Jul. 13, 1995

[30] Foreign Application Priority Data

Jul. 27, 1994 [JP] Japan .................. 6-194942

[51] Int. Cl.⁶ .................. B32B 17/08; B32B 23/00
[52] U.S. Cl. .................. 428/430; 428/34.7; 428/35.9; 428/435; 428/441; 428/442; 428/458; 428/461; 428/463; 428/532
[58] Field of Search .................. 428/34.4, 34.5, 428/430, 426, 441, 458, 461, 532, 698, 464, 452, 34.7, 35.9, 435, 442, 463

[56] References Cited

U.S. PATENT DOCUMENTS

| | | | |
|---|---|---|---|
| 4,919,984 | 4/1990 | Maruhashi et al. | 428/36.4 |
| 5,153,038 | 10/1992 | Koyama et al. | 428/35.8 |
| 5,221,790 | 6/1993 | Besnard et al. | 428/532 |
| 5,498,662 | 3/1996 | Tanaka et al. | 525/54.2 |
| 5,545,485 | 8/1996 | Hashitani et al. | 428/532 |
| 5,580,624 | 12/1996 | Andersen et al. | 428/532 |

FOREIGN PATENT DOCUMENTS

| | | |
|---|---|---|
| 2 684 922 | 6/1993 | France . |
| 1 086 482 | 10/1967 | United Kingdom . |

OTHER PUBLICATIONS

"Testing Method for Vicat Softening Temperature of Thermoplastics," Japanese Industrial Standard, by Japanese Standards Association, 1991.

"Testing Methods for Determination of the Water Vapour Transmission Rate of Moisture-Proof Packaging Materials (Dish Method)," Japanese Industrial Standard, by Japanese Standards Association, 1976.

Database WPI, week 8129, Derwent Publications Ltd., London, GB, AN 81-52273D and JP-A-56 062 832 (Suzuki S.) abstract.

*Primary Examiner*—Rena Dye
*Attorney, Agent, or Firm*—Lowe, Price, LeBlanc & Becker

[57] ABSTRACT

A composite deposited film including (A) a polymeric film substrate; (B) a deposit of an inorganic material formed on at least one side of the polymeric film substrate (A); and (C) a water-resistant film laminated on the deposit (B) and formed from a mixture containing a polycarboxylic acid or a partially neutralized product thereof and a saccharide in a weight ratio of 95:5 to 20:80 is provided. A production process of a composite deposited film, which includes the steps of forming a deposit (B) of an inorganic material on at least one side of a polymeric film substrate (A); casting a solution of a mixture containing a polycarboxylic acid or a partially neutralized product thereof and a saccharide in a weight ratio of 95:5 to 20:80 on the deposit (B); drying the mixture to form a film; and then subjecting the resultant dry film to a heat treatment at a temperature not lower than 100° C. (373 K), thereby forming a water-resistant film (C) on the deposit (B), is also provided.

10 Claims, No Drawings

COMPOSITE DEPOSITED FILM AND PRODUCTION PROCESS THEREOF

FIELD OF THE INVENTION

The present invention relates to composite deposited films, and more particularly to composite deposited films excellent in gas barrier properties to oxygen, water vapor, helium and the like, and a production process thereof. The composite deposited films according to the present invention are excellent in gas barrier properties and flexural fatigue resistance, and suitable for use in a field of packaging as various packaging materials for food, drugs, daily sundries and the like.

BACKGROUND OF THE INVENTION

In general, a function of preventing deterioration in the quality of contents is required of packaging materials. Particularly, in a field of food packaging materials, in which contents are susceptible to degeneration and putrefaction, the packaging materials are required to be excellent in gas barrier properties such as oxygen gas barrier property and water vapor barrier property.

For example, polyvinyl alcohol (PVA) films, ethylene-vinyl alcohol copolymer (EVOH) films, polyvinylidene chloride (PVDC) films, aluminum-deposited films, silicon oxide-deposited films and the like have heretofore been used either singly or in the form of composite films with various other films to impart gas barrier properties to packaging materials.

These gas barrier films each have both merits and demerits, and headway has been made in their improvements. For example, the PVA films are excellent in oxygen gas barrier property in a dry state, but have demerits that their oxygen gas barrier property is impaired to a great extent due to moisture absorption under high-humidity conditions, and moreover they are soluble in water and boiling water. Therefore, it has been conducted to enhance their crystallinity by a heat treatment or biaxial orientation, or to improve the dependence of the oxygen gas barrier property on humidity by providing the PVA films in the form of a laminate film having a multi-layer structure. The PVA films according to the conventional processes are however still insufficient in the prevention of deterioration in oxygen gas barrier property due to moisture absorption and the improving effect as to water resistance.

In food packaging, a factor bringing on deterioration in the quality of contents, such as degeneration and putrefaction, is decomposition of the contents by permeation of oxygen, water vapor absorption and various lights and heat. Among the various gas barrier films described above, the deposited films such as aluminum-deposited films have such many features that (1) they are good in both oxygen gas barrier property and water vapor barrier property, (2) they are excellent in barrier properties to visible light and ultra-violet light, (3) they are excellent in gloss, (4) they are hard to make pin-holes compared with aluminum foils, (5) they can be printed, and (6) various films can be laminated thereon by extrusion, dry lamination or the like to form composite deposited films.

The deposited films used in packaging materials are obtained by using, as a deposition source, an inorganic compound, such as a metal such as aluminum, metal oxide, inorganic matter or inorganic oxide to form a deposit of this inorganic material by one of various vapor deposition processes on a polymeric film substrate such as a polyethylene terephthalate (PET) film, oriented polypropylene (OPP) film or oriented nylon (ONY) film. Vapor deposition processes include chemical vapor deposition processes and physical vapor deposition processes. In the field of packaging, a vacuum deposition process, which is one of the physical vapor deposition processes, is mainly used. According to the vacuum deposition process, a high-functional deposited film can be mass-produced. Besides, composite deposited films obtained by laminating a polyethylene (PE) film, polypropylene (PP) film or the like, which can be heat-sealed, on the deposited film are commonly used as packaging materials.

Since the deposited films composed of the inorganic materials are generally poor in flexural fatigue resistance, however, their deposits tend to break when they are subjected to fabrication such as printing and/or bag-making, or used in applications to be subjected to flexing, and so their own gas barrier properties may possibly be impaired. Besides, when another thermoplastic resin film is laminated on the deposit of each of the deposited films by melt extrusion or dry lamination, the deposit may possibly tend to crack, resulting in great deterioration of gas barrier properties. In addition, the gas barrier properties of the deposited films are still insufficient according to their applications. Therefore, their applications may be further widened if the gas barrier properties can be more improved.

On the other hand, the present inventors found that when a film is formed from a mixture of poly(meth)acrylic acid or a partially neutralized salt thereof and saccharide, and the resultant dry film is subjected to a heat treatment, a water-resistant film excellent in oxygen gas barrier property can be obtained (Japanese Patent Application No. 194940/1994).

Both poly(meth)acrylic acid or the partially neutralized product thereof and saccharide are hydrophilic polymers. They may be formed into films from their aqueous solutions by a casting process. The films thus obtained are excellent in oxygen gas barrier property under dry conditions, but are markedly impaired in oxygen gas barrier property due to moisture absorption under high-humidity conditions, and moreover are insufficient in mechanical strength. On the other hand, when a film is formed from a mixture of both compounds and then subjected to a heat treatment, the film can be provided as a water-resistant film high in oxygen gas barrier property even under high-humidity conditions and insoluble in boiling water.

This water-resistant film excellent in oxygen gas barrier property can also be provided as laminates by laminating various thermoplastic resin films on this film (Japanese Patent Application Nos. 334405/1994 and 83881/1994). However, the formation of a composite film from this water-resistant film and a deposited film has not been yet proposed.

OBJECTS AND SUMMARY OF THE INVENTION

It is an object of the present invention to provide a composite deposited film which comprises a layer formed of a deposited film obtained by forming a deposit of an inorganic material on a polymeric film substrate, and is excellent in gas barrier properties and flexural fatigue resistance, and a production process thereof.

The present inventors have carried out an extensive investigation with a view toward overcoming the above-described problems involved in the prior art. As a result, it has been found that when a deposit of an inorganic material is formed on at least one side of a polymeric film substrate, a solution of a mixture of a polycarboxylic acid or a partially neutralized product thereof and a saccharide such as starch is cast on the deposit to form a dry film, and the resultant dry film is subjected to a heat treatment at a temperature not lower than 100° C. (373 K), thereby forming a water-resistant film having good oxygen gas barrier property, a composite deposited film excellent in gas barrier properties to water vapor, helium and the like, including oxygen, and also in flexural fatigue resistance can be obtained.

More specifically, by the formation of the composite film, the composite deposited film according to the present invention is surprisingly synergistically improved in oxygen gas barrier property, water vapor barrier property and helium gas barrier property beyond the degree predictable from these properties inherent in the respective layers of the deposited film and the water-resistant film. In the composite deposited film according to the present invention, the water-resistant film prevents the deposit from cracking. Therefore, this composite film is excellent in flexural fatigue resistance, and so the breaking of the deposit formed of the inorganic material and the deterioration in gas barrier properties are prevented. In addition, the composite deposited film according to the present invention is excellent in helium gas barrier property, and hence can be applied to new uses such as balloon materials. In order to impart heat-sealing property and the like to the composite deposited film according to the present invention, at least one additional layer may be provided thereon. The present invention has been led to completion on the basis of these findings.

According to the present invention, there is thus provided a composite deposited film comprising:

(A) a polymeric film substrate;

(B) a deposit of an inorganic material formed on at least one side of the polymeric film substrate (A); and (C) a water-resistant film laminated on the deposit (B) and formed from a mixture containing a polycarboxylic acid or a partially neutralized product thereof and a saccharide in a weight ratio of 95:5 to 20:80.

According to the present invention, there is also provided a process for the production of a composite deposited film, which comprises the steps of:

forming a deposit (B) of an inorganic material on at least one side of a polymeric film substrate (A);

casting a solution of a mixture containing a polycarboxylic acid or a partially neutralized product thereof and a saccharide in a weight ratio of 95:5 to 20:80 on the deposit (B);

drying the mixture to form a film; and then subjecting the resultant dry film to a heat treatment at a temperature not lower than 100° C. (373 K), thereby forming a water-resistant film (C) on the deposit (B).

DETAILED DESCRIPTION OF THE INVENTION

The present invention will hereinafter be described in detail.

Deposited film:

As examples of the polymeric film substrate (A), may be mentioned films formed from polyamides such as nylon 6, nylon 66, nylon 12, nylon 6.66 copolymers and nylon 6.12 copolymers; and other polymeric materials such as polyethylene terephthalate (PET), polyethylene naphthalate (PEN), polybutylene terephthalate (PBT), polycarbonate, poly(4-methylpentene-1), polyphenylene sulfide and polypropylene (PP). These films may be either unstretched or stretched and also include sheets of the above polymers.

The polymeric film substrate may contain various additives for imparting surface smoothness and stability. However, the content thereof may preferably be as low as possible because the adhesion between the polymeric film substrate and the deposit will be lowered if such additives bleed through the surface of the polymeric film substrate upon vacuum deposition. The polymeric film substrate may preferably have heat resistance to a degree withstanding the heat-treating conditions upon the formation of the water-resistant film. Polymeric films having poor heat resistance, such as those softened or impaired in dimension stability upon the heat treatment, are not preferred as the substrate.

Films formed from a polymer, the Vicat softening point of which is generally 100°–380° C., preferably 150°–380° C., more preferably 180°–380° C., are desirable as the polymeric film having high heat resistance. Among the above polymeric films, heat-resistant films formed from a polyamide, PET, PEN or the like, the Vicat softening point of which is at least 180° C., are particularly preferred. Incidentally, the Vicat softening point can be measured in accordance with JIS K-7206.

No particular limitation is imposed on the thickness of the polymeric film substrate. However, it is generally 5–1,000 µm, preferably 10–100 µm from the viewpoint of flexibility, economy and the like.

As the inorganic material used as a deposition source, there may be used metals, metal oxides, inorganic compounds and inorganic oxides, which are in routine use in the production of deposited films. Specific examples thereof include aluminum (Al), aluminum oxide ($Al_2O_3$), silicon oxides ($SiO_x$, x=1–2) and silicon oxynitrides ($SiO_xN_y$, x=0.6–0.8, y=0.7–0.9).

The thickness of the deposit (B) of the inorganic material can be optionally determined according to its desired transparency or opacity, color tone, gloss, flexibility and the like. However, it is generally 10–500 nm, preferably 10–300 nm, more preferably 10–150 nm. If the thickness of the deposit is too thin, the gas barrier properties of the resulting composite deposited film are lowered. If the deposit is too thick, the resulting composite deposited film becomes poor in handling property.

Vapor deposition processes include chemical vapor deposition processes and physical vapor deposition processes. However, it is generally preferable to use a vacuum deposition process, which is one of the physical vapor deposition processes, to conduct the vapor deposition. In the vacuum deposition process, there is preferably used a process in which a polymeric film substrate is generally disposed in a vacuum deposition device, and the deposition device is made vacuous to a degree of $10^{-4}$ Pa to evaporate the deposition source such as aluminum under heat, thereby continuously forming an even deposit on the polymeric film substrate.

Water-resistant film:

In the present invention, the water-resistant film (C) is formed by forming the deposit (B) of an inorganic material on at least one side of the polymeric film substrate (A), casting a solution of a mixture containing a polycarboxylic acid or a partially neutralized product thereof and a saccharide in a weight ratio of 95:5 to 20:80 on the deposit (B), drying the mixture to form a film, and then subjecting the resultant dry film to a heat treatment at a temperature not lower than 100° C. (373 K).

The dry film formed from the mixture of the polycarboxylic acid or the partially neutralized product thereof and the saccharide is soluble in water. However, this film turns insoluble in water and boiling water by subjecting to the heat treatment. This water-resistant film itself has excellent oxygen gas barrier property as demonstrated by an oxygen permeability constant of $1.25 \times 10^{-3}$ ml(STP)·cm/m²·h·atm{Pa} or lower as measured under conditions of a temperature of 30° C. and a relative humidity of 80%.

Polycarboxylic acid or the partially neutralized product thereof:

The polycarboxylic acid useful in the practice of the present invention is a polymer having at least two carboxylic groups in its molecule. Specific examples thereof include polyacrylic acid, polymethacrylic acid, copolymers of acrylic acid and methacrylic acid, polymaleic acid, and mixtures of at least two polymers thereof. Homopolymers of acrylic acid and methacrylic acid, and copolymers thereof are preferred. Of these, the homopolymer of acrylic acid and copolymers comprising a predominant amount of acrylic acid and methacrylic acid are particularly preferred from the viewpoint of oxygen gas barrier property. The number average molecular weight of the polycarboxylic acid is preferably within a range of from 2,000 to 250,000.

The partially neutralized product of the polycarboxylic acid useful in the practice of the present invention can be obtained by partially neutralizing the carboxyl groups of the above-described polycarboxylic acid with an alkali to form a carboxylate. As examples of the alkali, may be mentioned sodium hydroxide, lithium hydroxide, potassium hydroxide and ammonia (including aqueous ammonia). The partially neutralized product is generally prepared by adding the alkali to an aqueous solution of the polycarboxylic acid to conduct a reaction. The desired degree of neutralization can be achieved by controlling the quantitative ratio of the polycarboxylic acid to the alkali.

If the partially neutralized product of the polycarboxylic acid is used, the oxygen gas barrier property can be more improved compared with the case making use of the unneutralized polycarboxylic acid by suitably selecting the degree of neutralization. However, the oxygen gas barrier property shows a tendency to deteriorate when the degree of neutralization exceeds 20%. Therefore, the degree of neutralization of the partially neutralized product of the polycarboxylic acid is preferably within a range higher than 0% but not higher than 20%, more preferably higher than 0% but not higher than 18%, most preferably, of 5–15%.

Incidentally, the degree of neutralization is determined by the following equation:

Degree of neutralization=$(A/B) \times 100(\%)$ wherein A means the number of moles of carboxyl groups neutralized in 1 g of the partially neutralized polycarboxylic acid, and B denotes the number of moles of carboxyl groups in 1 g of the polycarboxylic acid before the partial neutralization.

Saccharide:

In the present invention, monosaccharides, oligosaccharides and polysaccharides are used as the saccharide (also referred to as carbohydrate). These saccharides also include sugar alcohols and various substitution products and derivatives of the saccharides. These saccharides are preferably soluble in water.

<Monosaccharide>

Monosaccharides are basic substances of saccharides, which are not decomposable into simpler molecules by hydrolysis, and serve as constitutive units of oligosaccharides and polysaccharides. The monosaccharides are generally represented by the general formula, $C_nH_{2n}O_n$. Of these, monosaccharides in which the number of carbon atoms (n) is 2, 3, 4, 5, 6, 7, 8, 9 or 10 are referred to as diose, triose, tetrose, pentose, hexose, heptose, octose, nonose and decose, respectively.

The monosaccharides are classified into aldoses having an aldehyde group and ketoses having a ketone group. Those in which n is 3 or more have at least one asymmetric carbon atom. Therefore, many stereoisomers may exist according to the number of asymmetric carbon atoms. However, only part of the stereoisomers are known in nature. Many of the monosaccharides existing in nature are pentose and hexose.

As the monosaccharides used in the present invention, aldoses which are aldehydes of a chain polyhydric alcohol of n=5 or more are preferred because they exist naturally in plenty. Examples of such monosaccharides include glucose, mannose, galactose and xylose. Of these, glucose and galactose are more preferred. These monosaccharides may be used either singly or in any combination thereof.

<Sugar alcohol>

Sugar alcohols are polyhydroxyalkanes obtained by reducing aldoses or ketoses.

As the sugar alcohols used in the present invention, chain polyhydric alcohols are preferred. Such sugar alcohols may be represented by the general formula, $C_nH_{2n+1}O_n$. Sugar alcohols in which n is 3, 4, 5, 6, 7, 8, 9 or 10 are referred to as tritol, tetritol, pentitol, hexitol, heptitol, octitol, nonitol and decitol, respectively. In the individual sugar alcohols, many stereoisomers exist according to the number of asymmetric carbon atoms.

In the present invention, the sugar alcohols of n=3–6 may preferably be used. As specific examples of the sugar alcohols, may be mentioned sorbitol, mannitol, dulcitol, xylitol, erythritol and glycerol. The sugar alcohols may be use either singly or in any combination thereof.

<Oligosaccharide>

Compounds having a structure that 2 to about 10 monosaccharides have been linked by glycosidic bonds are referred to as oligosaccharides. The oligosaccharides are classified into disaccharides, trisaccharides, tetrasaccharides, pentasaccharides and the like according to the number of monosaccharides linked. As specific examples thereof, may be mentioned sucrose, lactose, trehalose, cellobiose, maltose, raffinose and stachyose. Those (terminal-alcoholized oligosaccharides) obtained by alcoholizing these oligosaccharides at their terminals may also be used.

<Polysaccharide>

Polysaccharide is a generic name for high molecular compounds (polymerization degree: 10 or higher) obtained by polyglycosylation of monosaccharides. Of these, a polymer composed of monosaccharide units of one kind is referred to as a homopolysaccharide (homoglycan), while a polymer composed of monosaccharide units of two or more kinds is referred to as a heteropolysaccharide (hetroglycan). The polysaccharides widely exist as reserve polysaccharides (starch and the like), structural polysaccharides (cellulose and the like) and functional polysaccharides (heparin and the like) in the animal, plant and microorganism kingdoms.

Natural polysaccharides are high molecular compounds principally containing, as constitutive units, aldohexose and aldopentose which have been linked in a linear, branched or cyclic structure by glycosidic bonds. Each of aldopentose and aldohexose forms a 6-membered ring structure called a pyranose ring by intramolecular hemiacetal linking between the aldehyde group at the $C_1$ position and the hydroxyl group at the $C_5$ position. Aldohexose and aldopentose in molecules of the natural polysaccharides principally have this pyranose ring structure.

The aldohexose and aldopentose which are constitutive units of the natural polysaccharides include, in addition to neutral monosaccharides, the sulfuric esters, phosphoric esters and other organic acid esters of the neutral monosaccharides, methyl ethers of the neutral monosaccharides, uronic acids in which only the primary hydroxyl group in a monosaccharide has been oxidized into a carboxyl group, hexosamines in which the hydroxyl group at the $C_2$ position in aldohexose has been substituted by an amino group, and N-acetylhexosamines as their derivative, and 3,6-etherified aldohexose obtained by dehydration reaction between the hydroxyl groups at the $C_3$ and $C_6$ positions.

The natural polysaccharides are widely distributed in the animal and plant kingdoms, and exist in plants as components which are or are not involved in the constitution of cell walls of higher plants and seaweeds, and constitutive components for cells of microorganisms. The natural polysaccharides which are not involved in the constitution of the cell walls of the higher plants and seaweeds include mucilage contained in cell sap and reserve substances such as starch. In the animal kingdom, they exist as reserve substances such as glycogen and constitutive components for mucus such as heparin and chondroitin sulfate.

The natural polysaccharides are classified into neutral polysaccharides, acid polysaccharides and basic polysaccharides according to their constitutive components. The neutral polysaccharides include mannan and glucan as homopolysaccharides. Besides, as heteropolysaccharides, those composed of only hexose are contained in konjak and guaran, while those composed of only pentose are contained in xylan and araboxylan. On the other hand, those containing both hexose and pentose are known to be contained in tamarind and the like. With respect to the acid polysaccharides, those containing uronic acid only, or galacturonic acid and neutral monosaccharides, and those containing glucuronic acid and neutral monosaccharides include *Hibiscus manihot* and pectin, and chamomile and *Asparagus cochinchinensis*, respectively. Besides, there are acid polysaccharides containing the sulfuric esters, phosphoric esters, other organic acid esters or methyl ethers of neutral monosaccharides, or the 3,6-etherified aldohexose. Basic polysaccharides include those containing glucosamine or galactosamine as a constitutive component.

The polysaccharides used in the present invention include, in addition to these natural polysaccharides, those obtained by hydrolyzing these polysaccharides in a solid, liquid or solid-liquid mixed phase using, as a catalyst, an organic acid or inorganic acid, or a hydrolase for the individual polysaccharides, if necessary, under heat, and those obtained by further modifying the natural polysaccharides and the hydrolyzates thereof as described above.

Exemplary modifications of the natural polysaccharides and the hydrolyzates thereof include:

(1) esterification with an inorganic or organic acid, or etherification such as allyl etherification, methyl etherification or carboxymethyl etherification;

(2) cationizing treatment: for example, a reaction of the natural polysaccharide or a hydrolyzate thereof with 2-diethylaminoethyl chloride or 2,3-epoxypropyltrimethylammonium chloride;

(3) crosslinking treatment: for example, crosslinking making use of formaldehyde, epichlorohydrin, phosphoric acid or acrolein; and (4) grafting treatment: for example, graft polymerization of the natural polysaccharide or a hydrolyzate thereof with various kinds of monomers. Examples of the monomers include vinyl acetate, vinyl propionate, t-butyl vinyl ether, (meth)acrylamide, (meth)acrylic acid, alkyl(meth)acrylates, hydroxyalkyl (meth) acrylates, ethoxyalkyl(meth)acrylates, methoxypolyethylene glycol(meth)acrylates, 2-hydroxy-3-chloropropyl (meth)acrylate, dimethylaminoethyl (meth)acrylate, glycidyl methacrylate, acrylonitrile, styrene, maleic anhydride and itaconic acid.

Among these natural polysaccharides and hydrolyzates thereof, and modified products thereof, those soluble in water are preferred. Of the water-soluble natural polysaccharides and hydrolyzates thereof, and modified products thereof, homopolysaccharides comprising, as a constitutive component, glucose are more preferred. Examples of the homopolysaccharides comprising glucose include starch, cellulose, dextran, pullulan, water-soluble chitin and chitosan.

In the present invention, their corresponding sugar alcohols may be used in place of the natural polysaccharides and hydrolyzates thereof, and modified products thereof. In this invention, the sugar alcohols of the natural polysaccharides and hydrolyzates thereof, and modified products thereof mean those in which the carbonyl group at the $C_1$ position of a reducible terminal in each polymer has been reduced into an alcohol. Besides, saccharides such as cyclodextrin, in which molecular chains of monosaccharides are cyclically linked, may also be used in the present invention. The polysaccharides used in this invention may be used either singly or in any combination thereof.

<Starch>

Starch is included in the above-described polysaccharides. However, the starch used in the present invention will hereinafter be described in more detail.

The starch used in the present invention includes crude starch (unmodified starch) such as wheat starch, corn starch, waxy corn starch, potato starch, tapioca starch, rice starch, sweet potato starch and sago, and besides various kinds of modified starch.

Examples of the modified starch include (1) physically modified starch such as α-starch, separated and purified amylose, separated and purified amylopectin, and wet-heat treated starch, (2) enzyme-modified starch such as hydrolyzed dextrin, enzymolyzed dextrin and amylose, (3) chemically decomposed and modified starch such as acid-treated starch, hypochlorous acid-oxidized starch and starch dialdehyde, (4) chemically modified starch such as esterified starch (starch acetate, starch succinate, starch nitrate, starch phosphate, starch urea phosphate, starch xanthate, starch acetoacetate, etc.), etherified starch (starch allyl ether, starch methyl ether, starch carboxymethyl ether, starch hydroxyethyl ether, starch hydroxypropyl ether, etc.), cationic starch (a reaction product of starch with 2-diethylaminoethyl chloride, a reaction product of starch with 2,3-epoxypropyltrimethyl-ammonium chloride, etc.), and crosslinked starch (formaldehyde-crosslinked starch, epichlorohydrin-crosslinked starch, phosphoric acid-crosslinked starch, acrolein-crosslinked starch, etc.), and (5) graft-modified starch obtained by graft-polymerizing a monomer on various kinds of starch [exemplary monomers include vinyl acetate, vinyl propionate, t-butyl vinyl ether, (meth)acrylamide, (meth)acrylic acid, alkyl(meth)acrylates, hydroxyalkyl(meth)acrylates, ethoxyalkyl(meth)acrylates, methoxypolyethylene glycol(meth)acrylates, 2-hydroxy-3-chloropropyl(meth)acrylate, dimethylaminoethyl(meth) acrylate, glycidyl methacrylate, acrylonitrile, styrene, maleic anhydride and itaconic acid].

Of these kinds of starch, modified starch soluble in water is preferred. The starch may contain water. These kinds of starch may be used either singly or in any combination thereof.

A mixed system of the polycarboxylic acid or the partially neutralized product thereof and the saccharide is excellent in compatibility, and can provide an intimate mixture solution, for example, when dissolved at a given mixing ratio in water. In order to form the water-resistant film from the mixture of these components, a process (solvent casting), in which an aqueous solution of the mixture is cast on a support, and the mixture is dried to form a film, is generally preferred because a dry film excellent in transparency can be obtained with ease. In this invention, a deposited film is used as the support. When a film of the mixture of the polycarboxylic acid or the partially neutralized product thereof and the saccharide is formed on the deposit by the solvent casting, and the film is then subjected to the heat treatment to form a water-resistant film, it is avoided to cause the deposit to crack unlike the case of the customary lamination of thermoplastic resin films by melt extrusion or dry lamination, so that the resulting composite deposited film is improved in flexural fatigue resistance.

The mixture of the polycarboxylic acid or the partially neutralized product thereof and the saccharide can be prepared by a method in which the respective components are dissolved in water, a method in which aqueous solutions of the respective components are mixed with each other, a method in which a (meth)acrylic acid monomer or a maleic acid monomer is polymerized in an aqueous solution of the saccharide, a method in which a (meth)acrylic acid monomer or a maleic acid monomer is polymerized in an aqueous solution of the saccharide, and the resulting polymer is then neutralized with an alkali, or the like. The mixture may be prepared by using solvents other than water. In the solvent casting, the solids concentration of the solution is generally adjusted to about 1–30 wt. %. When the aqueous solution is prepared, solvents other than water, such as alcohol, flexibilizers, etc. may suitably be added if desired.

No particular limitation is imposed on the thickness of the water-resistant film, and it may hence be suitably determined as necessary for the end application intended. However, the thickness after the drying may be generally of the order of 0.5–100 μm, preferably 1–50 μm, more preferably 1–25 μm. According to the composite deposited film of the present invention, excellent effects can be exhibited even when the thickness of the water-resistant film is about 1–15 μm, and even about 1–5 μm.

The mixing ratio by weight of the polycarboxylic acid or the partially neutralized product thereof to the saccharide must be controlled to 95:5 to 20:80 from the viewpoint of improvement in gas barrier property such as oxygen gas barrier property and water vapor barrier property under high-humidity conditions. If the mixing ratio is outside the above range, no film exhibiting good gas barrier property such as oxygen gas barrier property and water vapor barrier property under high-humidity conditions can be provided. The mixing ratio may preferably be 90:10 to 40:60, more preferably from 85:15 to 50:50.

In order to form a water-resistant film having excellent oxygen gas barrier property from a mixture of the polycarboxylic acid or the partially neutralized product thereof and the saccharide, it is necessary to conduct a heat treatment after the formation of a film from the mixture by the solvent casting process. With respect to the films formed of the mixture, the heat treatment was conducted with temperature and time varied after the formation of the films. As a result, it has been found that the heat treatment of the film 3 μm thick permits the provision of a water-resistant film which has an oxygen permeability of 100 ml(STP)/m$^2$·day·atm{Pa} or lower as measured at a temperature of 30° C. and a relative humidity (RH) of 80% and is insoluble in boiling water. This oxygen permeability [100 ml(STP)/m$^2$·day·atm{Pa}] corresponds to an oxygen permeability constant of $1.25 \times 10^{-3}$ ml(STP)·cm/m$^2$·h·atm{Pa}. This oxygen permeability is identical to or better than that achieved by a heat-treated film formed of PVA alone.

In order to subject the dry film formed from the mixture of the polycarboxylic acid or the partially neutralized product thereof and the saccharide to a heat treatment, thereby obtaining a water-resistant film having oxygen gas barrier property as demonstrated by an oxygen permeability constant of $1.25 \times 10^{-3}$ ml(STP)·cm/m$^2$·h·atm{Pa} or lower as measured under conditions of 30° C. and 80% RH, it is only necessary to use the following heat-treating conditions in a dry heat atmosphere.

(a) $373 \leq T \leq 623$ (b) $\log t \geq -0.0631 \times T + 29.32$ wherein T denotes a heat-treating temperature (K) and t means heat-treating time (min).

In order to subject the dry film formed from the mixture of the polycarboxylic acid or the partially neutralized product thereof and the saccharide to a heat treatment, thereby obtaining a water-resistant film having oxygen gas barrier property as demonstrated by an oxygen permeability of 10 ml(STP)/m$^2$·day·atm{Pa} or lower as measured under conditions of 30° C. and 80% Pa (film thickness: 3 μm), it is only necessary to conduct the heat treatment under conditions satisfying the following relationship (c) in place of the relationship (b):

(c) $\log t \geq -0.0645 \times T + 30.71$, with the proviso that T satisfies the relationship (a).

The use of the heat-treating conditions satisfying the relationships (a) and (c) permits the provision of an oxygen gas barrier film having an oxygen permeability constant of $1.25 \times 10^{-4}$ ml(STP)·cm/m$^2$·h·atm{Pa} or lower as measured under conditions of 30° C. and 80% RH.

Besides the dry heat atmosphere such as in an oven, a method in which a dry film is brought into contact with a heating member, for example, a heated roll or a group of heated rolls, and the like may also be used as heat-treating means.

When the dry film is brought into contact with the heated roll, a heat treatment can be performed efficiently in a shorter period of time compared with the heat treatment in the dry heat atmosphere. An investigation by the present inventors has revealed that when the heat treatment is performed by means of the heated roll, an oxygen gas barrier film having an oxygen permeability constant of $1.25 \times 10^{-3}$ ml(STP)·cm/m$^2$·h·atm{Pa} or lower as measured under conditions of 30° C. and 80% RH can be obtained by heat-treating the dry film formed from the mixture of the polycarboxylic acid or the partially neutralized product thereof and the saccharide under conditions satisfying the following relationships (1) and (2):

(1) $373 \leq T \leq 623$ (2) $\log t \geq -0.122 \times T + 11.3$ wherein T denotes a heat-treating temperature (K) and t means heat-treating time (sec).

In order to obtain an oxygen gas barrier film having an oxygen permeability constant of $1.25 \times 10^{-4}$ ml(STP)·cm/m$^2$·h·atm{Pa} or lower as measured under conditions of 30° C. and 80% RH, it is only necessary to conduct the heat treatment under conditions satisfying the following relationship (3) in place of the relationship (2):

(3) $\log t \geq -0.0966 \times T + 24.1$, with the proviso that T satisfies the relationship (1).

In order to obtain an oxygen gas barrier film having an oxygen permeability constant of $1.25 \times 10^{-5}$ ml(STP)·cm/ m²·h·atm{Pa} or lower as measured under conditions of 30° C. and 80% RH, it is only necessary to conduct the heat treatment under conditions satisfying the following relationship (4) in place of the relationship (2):

(4) log t≧−0.0712×T+36.7, with the proviso that T satisfies the relationship (1).

Incidentally, the oxygen permeability constant [ml(STP)·cm/m²·h·atm{Pa}] of a film can be found by multiplying the oxygen permeability [ml(STP)/m²·day·atm{Pa}] of the film as measured under conditions of a film thickness of 3 μm by 1.25×10⁻⁵·cm.

In each case, the heat treatment is conducted at a heat-treating temperature (T) ranging from 373 K (100° C.) to 623 K (350° C.). However, it takes very long heat-treating time for achieving the desired oxygen gas barrier property if the heat-treating temperature is low. If the heat-treating temperature is high to the contrary, a water-resistant film having the desired oxygen gas barrier property can be obtained in shorter heat-treating time. However, if the heat-treating temperature is too high, there is a possibility that discoloration and/or decomposition may occur on the film. Accordingly, a heat-treating temperature within a range of from 433 K (160° C.) to 523 K (250° C.) is preferred.

The lower limit of the heat-treating time at a predetermined heat-treating temperature is preferably determined to a period of time for which a water-resistant film having an oxygen permeability constant (measured at 30° C. and 80% RH) of 1.25×10⁻³ ml(STP)·cm/m²·h·atm{Pa} or lower can be provided, while the upper limit of the heat-treating time is determined to a range in which neither discoloration nor decomposition occurs on the film.

The heat-treating conditions in the dry heat atmosphere are preferably determined to 160°–250° C. and 4 hours down to 1 minute, more preferably 180°–250° C. and 2 hours down to 1 minute, most preferably 200°–250° C. and 30 down to 1 minute.

The conditions for the heat treatment by the contact with a heating member such as a heated roll are preferably determined to 160°–250° C. and 180 down to 3 seconds, more preferably 180°–250° C. and 120 down to 3 seconds, most preferably 200°–250° C. and 60 down to 3 seconds.

In either heat-treating conditions, the heat treatment is conducted in long heat-treating time if the heat-treating temperature is low. The heat-treating time is made shorter as the heat-treating temperature is raised. Heat-treating time for which the desired oxygen gas barrier property and water resistance are achieved, and on the other hand, neither discoloration nor decomposition of the film occurs at a predetermined heat-treating temperature is used. From the viewpoint of productivity, it is desirable to use a relatively high heat-treating temperature and relatively short heat-treating time within the above-described preferable ranges of the heat-treating conditions.

Such a heat treatment permits the provision of a water-resistant film formed from the mixture of the polycarboxylic acid or the partially neutralized product thereof and the saccharide and having excellent oxygen gas barrier property. The oxygen gas barrier property of this water-resistant film is identical to or better than that of a heat-treated film formed of the PVA alone. In addition, the heat treatment can impart water resistance to the film formed from the mixture, and such a film is hence insoluble in water and boiling water. The phrase "insoluble in boiling water" means that the film is insoluble in boiling water (95° C.) when immersed for 10 minutes therein.

Composite deposited film:

The composite deposited film according to the present invention has, as an essential layer structure, a laminated structure of the polymeric film substrate (A)/the deposit (B)/the water-resistant film (C). It is necessary that the deposit of the inorganic material be contiguous to the layer of the water-resistant film. Neither the synergistic improving effect as to gas barrier properties nor the improving effect as to flexural fatigue resistance can be achieved unless the deposit and the layer of the water-resistant film are contiguously provided.

In order to produce the composite deposited film according to the present invention, an inorganic material is first used as a deposition source to form a deposit of the inorganic material on at least one side of a polymeric film substrate. A solution of a mixture of the polycarboxylic acid or the partially neutralized product thereof and the saccharide is then cast on the deposit of the resultant deposited film, and the mixture is dried, thereby forming a film. The resultant dry film is then heat-treated at a temperature not lower than 100° C. (373 K), thereby forming a water-resistant film excellent in oxygen gas barrier property.

The casting of the mixture solution of the polycarboxylic acid or the partially neutralized product thereof and the saccharide on the deposit can be performed in the following manner. The mixture solution is coated on the deposit of the deposited film to the desired thickness by means of, for example, an air-knife coater, kiss-roll coater, metering bar coater, gravure-roll coater, reverse-roll coater, dip coater or die coater, or a combination thereof. Water in the solution thus coated is then evaporated by blowing of heated air, infrared irradiation or the like using an arch dryer, straight bath dryer, tower dryer, floating dryer or drum dryer, or a combination thereof to dry the mixture, thereby forming a film. Thereafter, the film is heat-treated.

The composite deposited film according to the present invention is excellent in oxygen gas barrier property. For example, if the thicknesses of the polymeric film substrate, the deposit and the water-resistant film layer contiguous to the deposit are 12 μm, 50–80 nm and 1–3 μm, respectively, the oxygen permeability (measured at 30° C. and 80% RH) of the composite deposited film is generally 3 ml(STP)/m²·day·atm{Pa} or lower, preferably 1 ml(STP)/m²·day·atm{Pa} or lower, more preferably 0.5 ml(STP)/m²·day·atm{Pa} or lower.

The composite deposited film according to the present invention is excellent in water vapor barrier property. For example, if the thicknesses of the polymeric film substrate, the deposit and the water-resistant film layer contiguous to the deposit are 12 μm, 50–80 nm and 1–3 μm, respectively, the water vapor permeability (measured at 40° C. and 90% RH) of the composite deposited film is generally 5 g/m²·day or lower, preferably 2 g/m²·day or lower, more preferably 1 g/m²·day or lower.

The composite deposited film according to the present invention is excellent in helium gas barrier property. For example, if the thicknesses of the polymeric film substrate, the deposit and the water-resistant film layer contiguous to the deposit are 12 μm, 50–80 nm and 1–3 μm, respectively, the helium permeability (measured at 30° C. and 0% RH) of the composite deposited film is generally 150 ml(STP)/m²·day·atm{Pa} or lower, preferably 130 ml(STP)/m²·day·atm{Pa} or lower, more preferably 100 ml(STP)/m²·day·atm{Pa} or lower. In particular, the helium permeability can be markedly lessened when a deposited film having an aluminum deposit is used.

The composite deposited film according to the present invention is synergistically improved in gas barrier properties beyond the degree predictable from the gas barrier properties inherent in the respective layers of the deposited film (the polymeric film substrate/the deposit) and the water-resistant film.

More specifically, assuming that the oxygen permeability [ml(STP)/m²·day·atm{Pa}] of the composite deposited film, the oxygen permeability of the deposited film (the polymeric film substrate/the deposit) and the oxygen permeability of the water-resistant film at a certain temperature (for example, 30° C.) and a certain relative humidity (for example, 80%) are Z, X and Y, respectively, the following relationship is satisfied.

$$(1/Z) > (1/X) + (1/Y)$$

The same shall apply to the water vapor permeability and the helium permeability. Therefore, the composite deposited film according to the present invention has the synergistic effects as to the gas barrier properties.

The composite deposited film according to the present invention is excellent in flexural fatigue resistance and hence keeps high gas barrier properties even after a flexural fatigue test using a Gerbo flex tester.

The composite deposited film according to the present invention is not limited to that having a laminated structure of the polymeric film substrate (A)/the deposit (B)/the water-resistant film (C), and one or more other additional layers may hence be laminated if desired. For example, if the composite deposited film is insufficient in heat-sealing property, a heat-sealable layer may be laminated on at least one side thereof. Examples of the heat-sealable layer include layers formed from polyolefins such as low-density polyethylene, linear low-density polyethylene, high-density polyethylene, ethylene-vinyl acetate copolymers, polypropylene, ethylene-acrylic acid copolymers, ethylene-acrylic acid salt copolymers and ethylene-ethyl acrylate copolymers, nylon copolymers such as nylon 6.66 copolymers and nylon 6.12 copolymers, etc.

Besides, a thermoplastic resin layer may be laminated on the layer of the water-resistant film to improve the dependence of oxygen gas barrier property on humidity, mechanical strength, moisture resistance and the like of the water-resistant film layer. In addition, various films and coating layers may be provided to impart functions such as gloss, fog resistance and ultraviolet barrier property to the composite deposited film.

If the adhesion between the individual layers is insufficient when the various layers are additionally provided, an adhesive layer may be provided therebetween. As examples of adhesives used for it, may be mentioned various kinds of adhesives such as urethane-based, acrylic-based and polyester-based adhesives, which are commonly used for dry lamination and the like of various films. Various kinds of additives such as an antioxidant, lubricant, ultraviolet absorbent, pigment, filler and antistatic agent may be added to the individual layers of the composite deposited films according to the present invention if desired.

ADVANTAGES OF THE INVENTION

According to the present invention, there are provided composite deposited films far excellent in oxygen gas barrier property, water vapor barrier property and helium gas barrier property. In the present invention, a solution of the mixture of the polycarboxylic acid or the partially neutralized product thereof and the saccharide is cast on a deposit of a deposited film, which is formed of an inorganic material such as aluminum or silicon oxide, to form a film, and this film is subjected to a heat treatment. Therefore, the composite deposited film thus formed can be provided as a film the deposit of which is prevented from cracking. In addition, the composite deposited film is improved in the flexural fatigue resistance of the deposited film. The composite deposited film according to the present invention exhibits synergistic improving effects as to gas barrier properties far beyond the level predictable from the gas barrier properties inherent in the respective layers thereof.

Since the deposit of the composite deposited film according to the present invention is protected by a layer of the water-resistant film, its gas barrier properties are not impaired upon its fabrication such as printing and lamination. Therefore, the composite deposited films according to the present invention are suitable for use as packaging materials for food, drugs, daily sundries and the like. The composite deposited films are also useful as balloon materials and the like because of their excellent helium gas barrier property.

EMBODIMENTS OF THE INVENTION

The present invention will hereinafter be described more specifically by the following examples and comparative examples. However, it should be borne in mind that the present invention is not limited to these examples only.

Physical properties described in the examples and comparative examples were measured in the following manner.
(1) Oxygen permeability:
Measured under conditions of 30° C. and 80% RH by means of an oxygen permeability tester, OX-TRAN 2/20 model manufactured by Modern Control Company in accordance with ASTM D-3985.
(2) Water vapor permeability:
Measured under conditions of 40° C. and 90% RH in accordance with JIS Z-0208.
(3) Helium permeability:
Measured under conditions of 30° C. and 0% RH by means of a Yanagimoto gas transmission rate measuring device, GTR-10A, and a GAS CHROMATOGRAPH, G3800, both, manufactured by Yanagimoto Seisakusho Co., Ltd.
(4) Flexural fatigue resistance (oxygen permeability after Gerbo test)

With respect to each test sample, the flexural fatigue resistance was evaluated by means of a Gerbo flex tester manufactured by Rigaku Kogyo K.K. Following MIL-B131C, a sample piece of 30 cm×20 cm (12 in×8 in) was formed into a cylinder 9 cm (3.5 in) across. Both ends of the cylindrical specimen were held at an initial holding interval of 18 cm (7 in). The cylindrical specimen was then subjected to repeated reciprocating motion at a rate of 40 cycles/min by an operation that the specimen was compressed in a stroke of 15 cm (6 in) as a whole, during which the specimen was twisted by 440 degrees at the 9 cm (3.5 in) portion of the stroke, and then linearly compressed at the residual 6 cm (2.5 in) portion of the stroke as it is (test operation A), thereby flexing the specimen 5 times at 25° C. and 50% RH. Thereafter, the oxygen permeability of the sample tested was measured at 30° C. and 80% RH.

EXAMPLE 1

A 25 wt. % aqueous solution of polyacrylic acid (product of Wako Pure Chemical Industries, Ltd., number average molecular weight: 150,000) was used as polyacrylic acid (PAA). A calculated amount of sodium hydroxide was added to the aqueous solution of PAA, thereby preparing a partially neutralized product (PAANa) of PAA having a degree of neutralization of 10%. On the other hand, soluble starch (product of Wako Pure Chemical Industries, Ltd., water-soluble starch obtained by hydrolyzing potato starch with an acid) was used as a saccharide to prepare a 10 wt. % aqueous solution thereof.

The above-prepared aqueous PAANa solution and aqueous soluble starch solution were used to prepare an aqueous solution (polymer concentration: 10 wt. %) of a mixture containing PAANa and the soluble starch in a weight ratio of 70:30.

The above-prepared aqueous solution was coated by a Meyer bar using a bench coater (K303 PROOFER, manufactured by RK Print-Coat Instruments, Ltd.) on a deposit of a deposited film obtained by forming a deposit of aluminum (Al) to a thickness of 50 nm on a polyethylene terephthalate (PET) film 12 μm thick, and water in the aqueous solution was then evaporated by a dryer, thereby obtaining a dry film 2 μm thick. This deposited film, on which the dry film had been formed, was subjected to a heat treatment at 200° C. for 15 minutes in an oven. The laminated structure and results of measurement as to gas barrier properties (oxygen permeability, water vapor permeability and helium permeability) of the composite deposited film thus obtained are shown in Table 1.

EXAMPLE 2

A composite deposited film was obtained in the same manner as in Example i except that a PET film with an $SiO_x$ deposit 80 nm thick was used in place of the aluminum-deposited film. The results are shown in Table 1.

Comparative Example 1

The same Al-deposited film as that used in Example 1 was provided as Comparative Example 1.

Calculating method of oxygen permeability of water-resistant film:

Oxygen permeabilities (at 30° C., 80% RH) of the PET film and the laminate, on which the water-resistant film had been formed, were measured by means of an oxygen permeability tester, OX-TRAN 2/20 model manufactured by Modern Control Company, and the oxygen permeability, $P_{film}$ of the water-resistant film was calculated in accordance with the following equation:

$$1/P_{total}=1/P_{film}+1/P_{PET}$$

wherein $P_{total}$: oxygen permeability of the laminate;

$P_{film}$: oxygen permeability of the water-resistant film; and $P_{PET}$: oxygen permeability of the PET film.

Comparative Example 5

A composite deposited film was produced in the same manner as in Example 1 except that the aqueous solution containing the mixture of PAANa and the soluble starch in Example 1 was coated on the PET side of the Al-deposited film.

TABLE 1

| | Laminated structure | | | Oxygen permeability [ml STP/m² · day · atm{Pa}] | Water vapor permeability (g/m² · day) | Helium permeability [ml STP/m² · day · atm{Pa}] |
|---|---|---|---|---|---|---|
| | First layer | Second layer | Third layer | | | |
| Ex. 1 | Starch + PAANa (2 μm) | Al deposit (50 nm) | PET (12 μm) | 0.02 0.02 | 0.2 | 2 |
| Ex. 2 | Starch + PAANa (2 μm) | $SiO_x$ deposit (80 nm) | PET (12 μm) | 0.02 | 0.2 | 50 |
| Comp. Ex. 1 | Al deposit (50 nm) | PET (12 μm) | — | 1.7 | 2.6 | 78 |
| Comp. Ex. 2 | $SiO_x$ deposit (80 nm) | PET (12 μm) | — | 1.6 | 0.8 | 200 |
| Comp. Ex. 3 | PET (12 μm) | — | — | 140 | 50 | 6600 |
| Comp. Ex. 4 | Starch + PAANa (2 μm) | — | — | 0.2 | 5000 | 600 |
| Comp. Ex. 5 | Al deposit (50 nm) | PET (12 μm) | Starch + PAANa (2 μm) | 0.2 | 2.6 | 70 |

Comparative Example 2

The same $SiO_x$-deposited film as that used in Example 2 was provided as Comparative Example 2.

Comparative Example 3

A PET film 12 μm thick was provided as Comparative Example 3.

Comparative Example 4

The aqueous solution containing the mixture of PAANa and the soluble starch prepared in Example 1 was coated on a PET film to obtain a dry film 2 μm thick. This dry film was heat-treated in the same manner as in Example 1 to produce a laminate. Using this laminate, the oxygen permeability of the water-resistant film (heat-treated film) formed from the mixture of PAANa and the starch was determined in the following manner.

As apparent from the results shown in Table 1, it is understood that the composite deposited film of Example 1 is markedly improved in all gas barrier properties to oxygen, water vapor and helium compared with the Al-deposited film (Comparative Example 1) and the water-resistant film (Comparative Example 4) formed from the mixture of PAANa and the soluble starch. Similarly, the composite deposited film of Example 2 is markedly improved in all gas barrier properties to oxygen, water vapor and helium compared with the $SiO_x$-deposited film (Comparative Example 2) and the water-resistant film (Comparative Example 4) formed from the mixture of PAANa and the soluble starch. These improving effects as to gas barrier properties are both synergistic.

In the case (Comparative Example 5) where the water-resistant film formed of the mixture of PAANa and the soluble starch was formed on the PET side of the Al-deposited film, a deposited film good in gas barrier properties can also be provided. However, such a film cannot exhibit such synergistic effects as the case where the water-resistant film was formed on the deposit.

Incidentally, the water-resistant film formed from the mixture of PAANa and the soluble starch was insoluble in boiling water.

EXAMPLE 3

After the composite deposited film produced in Example 1 was subjected to a flexural fatigue resistance test (Gerbo test), its oxygen permeability was measured. The oxygen permeability before the test is also shown.

Comparative Example 8

With respect to a PET film 12 μm thick, the oxygen permeabilities before and after the flexural fatigue resistance test were measured.

The results of Examples 3–6 and Comparative Examples 6–8 are shown in Table 2.

TABLE 2

| | Laminated structure | | | | Oxygen permeability [ml (STP)/m² · day atm{Pa}] | |
|---|---|---|---|---|---|---|
| | First layer | Second layer | Third layer | Fourth layer | Before Gerbo test | After Gerbo test |
| Ex. 3 | Starch + PAANa (2 μm) | Al deposit (50 nm) | PET (12 μm) | — | 0.02 | 0.7 |
| Ex. 4 | Starch + PAANa (2 μm) | SiO$_x$ deposit (80 nm) | PET (12 μm) | — | 0.02 | 0.7 |
| Ex. 5 | CPP (50 μm) | Starch + PAANa (2 μm) | Al deposit (50 nm) | PET (12 μm) | 0.02 | 0.1 |
| Ex. 6 | CPP (50 μm) | Starch + PAANa (2 μm) | SiO$_x$ deposit (80 nm) | PET (12 μm) | 0.02 | 0.1 |
| Comp. Ex. 6 | Al deposit (50 nm) | PET (12 μm) | — | — | 1.7 | 46 |
| Comp. Ex. 7 | SiO$_x$ deposit (80 nm) | PET (12 μm) | — | — | 1.6 | 29 |
| Comp. Ex. 8 | PET (12 μm) | — | — | — | 140 | 140 |

EXAMPLE 4

After the composite deposited film produced in Example 2 was subjected to the flexural fatigue resistance test, its oxygen permeability was measured. The oxygen permeability before the test is also shown.

EXAMPLE 5

An unstretched polypropylene (CPP) film 50 μm thick was laminated on the water-resistant film side of the composite deposited film produced in Example 1. With respect to the thus-obtained laminate, the oxygen permeabilities before and after the flexural fatigue resistance test were measured.

EXAMPLE 6

A CPP film 50 μm thick was laminated on the water-resistant film side of the composite deposited film produced in Example 2. With respect to the thus-obtained laminate, the oxygen permeabilities before and after the flexural fatigue resistance test were measured.

Comparative Example 6

With respect to the same Al-deposited film as that used in Example 1, the oxygen permeabilities before and after the flexural fatigue resistance test were measured.

Comparative Example 7

With respect to the same SiO$_x$-deposited film as that used in Example 2, the oxygen permeabilities before and after the flexural fatigue resistance test were measured.

As apparent from the results shown in Table 2, it is understood that the composite deposited films (Examples 3–6) according to the present invention have excellent flexural fatigue resistance.

EXAMPLE 7

A linear low-density polyethylene (LLDPE) film 30 μm thick was dry-laminated on the composite deposited film obtained in Example 1 in the customary way. An adhesive used was an adhesive (base resin: Adcoat 335A; hardener: CAT-10) produced by Toyo Morton K.K.

The LLDPE layer of the laminated film thus obtained was heat-sealed to produce a spherical balloon 50 cm across, and helium was introduced into the balloon. The suitability for balloon of the laminated film was evaluated by floating the balloon in a room of 23° C. and 50% RH and counting the number of days (floating days) from the time the balloon floated to a height of 1 meter up to the time it fell to the floor.

Comparative Example 9

An LLDPE film 30 μm thick was dry-laminated on the Al-deposited film of Comparative Example 1 in the same manner as in Example 7 to produce a balloon.

As apparent from Table 3, it is understood that the composite deposited film according to the present invention is excellent in suitability for balloon.

TABLE 3

| | Laminated structure | | | | Floating days (days) |
|---|---|---|---|---|---|
| | First layer | Second layer | Third layer | Fourth layer | |
| Ex. 7 | Starch + PAANa (2 μm) | Al deposit (50 nm) | PET (12 μm) | LLDPE (30 μm) | At least 30 |
| Comp. Ex. 9 | Al deposit (50 nm) | PET (12 μm) | LLDPE (30 μm) | — | 10 |

We claim:

1. A composite deposited film comprising:

(A) a polymeric film substrate;

(B) a deposit of an inorganic material formed on at least one side of the polymeric film substrate (A); and (C) a water-resistant film laminated on the deposit (B) and formed from a mixture containing a polycarboxylic acid or a partially neutralized product of the polycarboxylic acid which is obtained by partially neutralizing the carboxyl groups of the polycarboxylic acid with an alkali and a saccharide in a weight ratio of 95:5 to 20:80.

2. The composite deposited film according to claim 1, wherein the water-resistant film (C) has an oxygen permeability constant of $1.25 \times 10^{-3}$ ml(STP)·cm/m$^2$·h·atm{Pa} or lower as measured under conditions of 30° C. and 80% relative humidity.

3. The composite deposited film according to claim 1, wherein the water-resistant film (C) is insoluble in water and boiling water.

4. The composite deposited film according to claim 1, wherein the polycarboxylic acid is at least one polymer selected from the group consisting of polyacrylic acid, polymethacrylic acid, acrylic acid-methacrylic acid copolymers and polymaleic acid.

5. The composite deposited film according to claim 1, wherein the partially neutralized product of the polycarboxylic acid is obtained by partially neutralizing carboxyl groups of the polycarboxylic acid with an alkali to a degree of neutralization not higher than 20%.

6. The composite deposited film according to claim 1, wherein the saccharide is at least one water-soluble saccharide selected from the group consisting of monosaccharides, oligosaccharides and polysaccharides.

7. The composite deposited film according to claim 6, wherein the saccharide is starch.

8. The composite deposited film according to claim 1, wherein the polymeric film substrate (A) is a film formed from a polyamide, polyethylene terephthalate, polyethylene naphthalate, polybutylene terephthalate, polycarbonate, poly(4-methylpentene-1), polyphenylene sulfide or polypropylene.

9. The composite deposited film according to claim 1, wherein the deposit (B) of the inorganic material is formed from aluminum, aluminum oxide, silicon oxide or silicon oxynitride.

10. The composite deposited film according to claim 1, wherein a heat-sealing layer is additionally laminated on at least one side of the composite deposited film.

* * * * *